Patented June 1, 1954

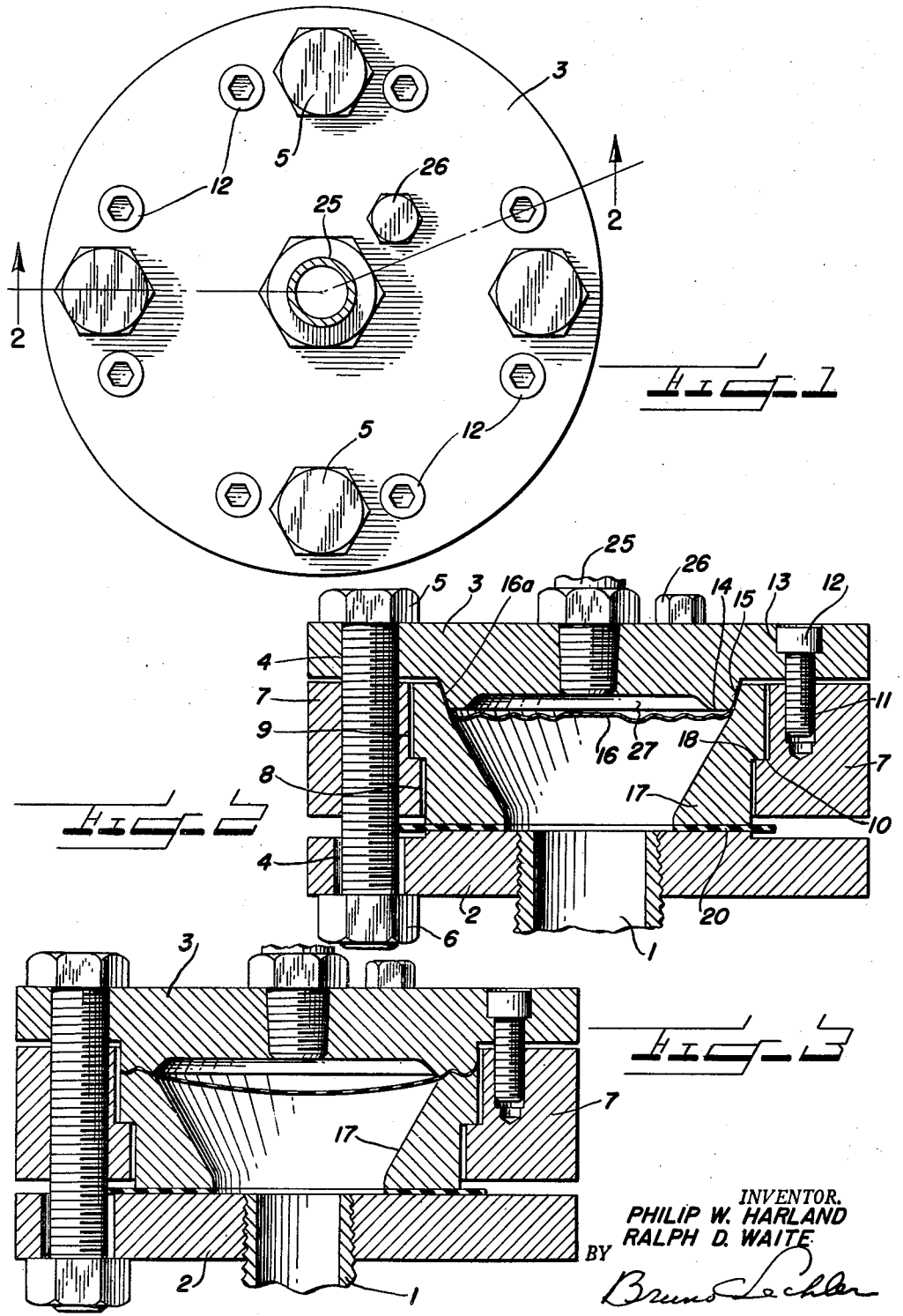

2,679,760

UNITED STATES PATENT OFFICE 2,679,760

PROTECTIVE UNIT FOR CONDITION
RESPONSIVE DEVICES

Philip W. Harland, Quakertown, and Ralph D. Waite, Sellersville, Pa., assignors to American Machine and Metals, Inc., East Moline, Ill., a corporation of Delaware Application September 24, 1948, Serial No. 51,032

5 Claims. (Cl. 73—395)

The invention relates to a pressure-transmitting unit which may be installed in a pipe line between the fluid whose pressure is to be measured and a pressure gauge. This pressure-transmitting unit comprises two chambers separated by a flexible diaphragm. One chamber consists of materials able to resist the corrosive or other action of the fluid whose pressure is to be transmitted. The other chamber contains a pocket of inert fluid and is connected to a Bourdon tube or other gauge. The pressure of the fluid is transmitted through the diaphragm to the inert liquid and through this liquid to the Bourdon tube gauge which will then indicate the pressure of the corrosive fluid without the gauge coming into contact therewith.

It is essential that such units be disassembled at times to permit cleaning out the chamber exposed to the corrosive fluid. It is desirable not to disassemble the diaphragm or meddle with the pocket of inert fluid between the diaphragm and the one portion of the unit when cleaning the corrosive fluid chamber. The invention provides means for opening up the unit for cleaning the compartment exposed to corrosive fluids and separate means for completely disassembling the unit if it is desired to replace the diaphragm.

Since a variety of liquids are frequently found in the same plant which cannot be allowed to enter a Bourdon tube either because the liquid would attack it or because solids would be deposited preventing free movement of the gauge, it is desirable to have a pressure-transmitting unit in which those parts which come in contact with the corrosive fluid can readily be changed when the unit is transferred for measuring the pressure on one material to measuring the pressure on another material which attacks the materials which were resistant to the previous fluid.

Since pipe lines are frequently equipped with standard flanges, it is one object of the invention to provide a pressure transmitting unit which can be directly attached to a standard flange already on the pipe.

It is a further object of the invention to clamp the diaphragm between two conical surfaces with means allowing one of these conical surfaces to align itself laterally relative to the other, thereby securing uniform bearing around the entire circumference of the diaphragm, and thus sealing in the inert liquid.

It is a further object of the invention to hold the diaphragm between the flanged ring and a flanged plate with means for holding the flanged ring against the plate, thus holding the diaphragm locked in place, even though the unit is disassembled for cleaning. This permits the use of the smallest amounts of expensive materials that resist the fluid and requires a minimum of machining of said materials.

The device may be used with either metal or rubber diaphragms.

Fig. 1 is a plan view of the invention.

Fig. 2 is a cross-section along line 2—2 in Fig. 1 showing the metal diaphragm in place.

Fig. 3 is a cross-section along line 2—2 in Fig. 1 slightly modified to show how a rubber diaphragm may be used.

1 indicates a pipe containing a corrosive fluid whose pressure is to be measured. This is equipped with the standard flange 2. Pipe 1 may be of porcelain, Haveg; or any metal, and the flange may be integral, welded on, or screwed on. #3 is the mating flange. Both flanges are drilled with holes 4 through which the flange bolts 5 pass. The entire unit is clamped together by tightening nuts 6 on these bolts 4. An annular ring 7 has a bore 8 through part of its length and a larger bore 9 through the balance of its length. This forms an intervening shoulder 10. This ring 7 has holes 11 drilled and threaded to receive studs 12 having heads that enter into a counterbore hole 13 in flange 3. By drawing up on studs 12, the ring 7 is drawn toward the flange.

On the underside of the flange 3 is a ring 14 having sloping conical machined surface 15 on the outside. A corrugated metal diaphragm 16 may have an upturned flange 16a adapted to fit the conical surface 15. When this diaphragm is in place against the flange, a space 27 is formed for the inert liquid between the diaphragm and flange 3. The socket of a gauge, shown at 25, is screwed into the hole in flange 3, thus connecting the space 27 with the liquid in the Bourdon tube (not shown).

The diaphragm is held in place by having the upturned flange 16a clamped between the surface 15 and the conical inner surface of an annular ring 17, free to align itself laterally. This loose annular ring has a shoulder 18 on its outside surface.

The center bore of this ring may be conical so as to permit the use of a diaphragm of relatively large diameter. This is desirable to eliminate the effects of temperature change on the diaphragm. It also permits keeping the volume of material in the ring small which is desirable when using acid resisting rings of expensive material.

The shoulder, already described, on annular ring 7 bears against the shoulder on ring 17, thus allowing the ring to align itself laterally with conical surface 15 and clamping the upturned flange of the diaphragm between conical surface on flange 3 and ring 17 and the flange 2 so that when bolts 4 are drawn up, flange 2 will transmit pressure through the gasket 20, ring 17, diaphragm flange 16a and top flange 3. 26 is a threaded plug in a hole extending through flange 3 into space 27 for evacuating the air before filling the space with the inert fluid.

We claim:

1. A pressure-transmitting unit for insertion between a gauge adapted to be actuated by an inert liquid and a corrosive liquid whose pressure is to be measured comprising, in combination, a standard pipe flange of corrosion-resisting material, a gasket adjacent said flange, a ring of corrosion-resisting material having an external flange and a conical bore bearing against the gasket, a diaphragm of corrosion-resisting material closing the other end of said ring, a second flange drilled to match the standard flange and having a matching conical surface bearing against said diaphragm, an external ring having an internal flange engaging the external flange of said first named ring; screws for drawing said external ring towards the said second flange to clamp the diaphragm between the first-named ring and the second flange, pipe-flange bolts for drawing said flanges together thereby clamping gasket, ring and diaphragm to form two chambers, one of material resisting the corrosive fluid, the other for inert liquid, separated by the pressure-transmitting diaphragm.

2. A pressure-transmitting unit for insertion between a gauge adapted to be actuated by an inert liquid and a corrosive liquid whose pressure is to be measured comprising, in combination, a standard pipe flange of corrosion-resisting material, a gasket adjacent said flange, a ring of corrosion-resisting material bearing against the gasket, and having an external flange and a central conical bore, a diaphragm of corrosion-resisting material closing the other end of said ring, a second flange drilled to match the standard flange and having a matching conical surface bearing against said diaphragm, an external ring having an internal flange engaging the external flange of said first-named ring in a manner giving the two rings relative freedom to allow the conical surfaces on ring and flange to align themselves to uniformly engage the diaphragm around its entire circumference, screws for drawing said external ring towards the said second flange, pipe-flange bolts for drawing said flanges together thereby clamping gasket, ring and diaphragm to form two chambers, one of material resisting the corrosive fluid, the other for inert liquid, separated by the pressure-transmitting diaphragm.

3. In a pressure transmitting unit adapted to be inserted between a gauge and a container of a corrosive liquid whose pressure is to be measured, a plate having a recess surrounded by an annular boss having a male conical surface, an annular member with a mating conical surface at one end, a disc type diaphragm whose edges are clamped between the mating conical surfaces, means to draw the plate and the annular member together to clamp the disc in place, a plate closing the other end of the annular member, means adapted to draw the two plates together against the annular member to form an independent chamber between the diaphragm and each plate, a connection through one plate to a pressure gauge, a connection through the other plate to the corrosive fluid container.

4. In a pressure transmitting unit adapted to be inserted between a gauge and a container of a corrosive liquid whose pressure is to be measured, a standard pipe flange having an annular boss on one face thereof forming an enclosed recess and having a male conical surface, an annular member, a disc type diaphragm whose edges are clamped between the rim of the annular member and said male conical surface on the pipe flange, means to draw the pipe flange and the annular member together to clamp the disc in place, a second pipe flange closing the other end of the annular member, a gasket between them, and bolts drawing the two pipe flanges together against the annular member to form an independent chamber between the diaphragm and each flange, a pipe extending from one pipe flange to a pressure gauge, another connection extending from the other pipe flange to the container of corrosive fluid.

5. A pressure transmitting unit adapted to be detachably mounted between a fluid-conveying pipe and a fluid condition responsive device for transmitting the pressure of the fluid in the pipe to a fluid within the condition responsive device comprising, in combination, a pair of standard pipe flanges, one of said flanges adapted to be connected to a fluid-conveying pipe and the other to a fluid condition responsive device, an inner annular ring between the flanges formed with a central opening therethrough to register at one end with the inlet to the condition responsive device and at the other end with the fluid-conveying pipe, said ring being formed with an external annular flange, an outer ring engageable around the inner ring and formed with an internally directed shoulder to engage the flange on said inner ring for limiting movement of the inner ring relative to said other flange, a diaphragm extending across said opening and having its edges confined between the inner ring and said other flange to separate the fluids in the pipe and the condition responsive device, bolts extending through the flanges and the outer ring for drawing these members together, means in addition to said bolts to draw the outer ring towards said other flange so as to hold the edges of the diaphragm clamped between the inner ring and said other flange even when the pipe flanges are disassembled from each other, and a gasket between the inner ring and the one standard pipe flange.

References Cited in the file of this patent

UNITED STATES PATENTS

| Number | Name | Date |
|---|---|---|
| 2,034,646 | Baumert et al. | Mar. 17, 1936 |
| 2,207,807 | Hopkins | July 16, 1940 |
| 2,317,073 | Martin | Apr. 20, 1943 |

FOREIGN PATENTS

| Number | Country | Date |
|---|---|---|
| 508,524 | France | July 27, 1920 |
| 916,664 | France | Aug. 26, 1946 |